(12) United States Patent
Gibson et al.

(10) Patent No.: US 6,796,789 B1
(45) Date of Patent: Sep. 28, 2004

(54) METHOD TO FACILITATE FLAMELESS COMBUSTION ABSENT CATALYST OR HIGH TEMPERATURE OXIDENT

(75) Inventors: William C. Gibson, Tulsa, OK (US); Robert L. Gibson, Broken Arrow, OK (US); James T. Eischen, Tulsa, OK (US)

(73) Assignee: Petro-Chem Development Co. Inc., New York, NY (US)

( * ) Notice: Subject to any disclaimer, the term of this patent is extended or adjusted under 35 U.S.C. 154(b) by 0 days.

(21) Appl. No.: 10/341,942

(22) Filed: Jan. 14, 2003

(51) Int. Cl.$^7$ .............................................. F23L 15/00
(52) U.S. Cl. .............................. 431/2; 431/11; 431/12
(58) Field of Search ............................... 431/2, 10, 11, 431/12, 19, 75, 90; 166/303

(56) References Cited

U.S. PATENT DOCUMENTS

| | | | |
|---|---|---|---|
| 3,928,961 A | 12/1975 | Pfefferle | 60/39.02 |
| 5,168,835 A | * 12/1992 | Last | 431/1 |
| 5,255,742 A | 10/1993 | Mikus | 166/303 |
| 6,269,882 B1 | 8/2001 | Wellington et al. | 166/303 |

* cited by examiner

*Primary Examiner*—Jiping Lu
(74) *Attorney, Agent, or Firm*—Head, Johnson & Kachigian

(57) ABSTRACT

A method and apparatus whereby flameless combustion may be precipitated and sustained within the essentially oval combustion chamber of an integrated heater/burner apparatus. The invention provides for an air inlet and fuel source in combination with recirculating flue gas within the apparatus combustion chamber to precipitate and maintain flameless combustion of the combined gases along, and within, a narrowly defined boundary. Air is introduced to the oval combustion chamber via an air inlet. Fuel gas is combined with recirculating flue gases with continued heating of the recirculating flue gas, introduced air or both flue gas and air, until the temperature at the boundary interface between the air and inerted fuel gas exceeds an auto ignition temperature of the boundary interface components. A fuel gas stream absent a flamed portion thereof is combined with the recirculating flue gas and then allowed to diffuse with the air stream in a measure sufficient to sustain flameless combustion and chamber operational temperature of generally between 1500° F. and 1900° F. The essentially oval configuration of the integrated heater/burner allows for increased mass and circulation rates beyond that possible with heaters of the contemporary art and as a consequence thereof provides for uniform, complete and cooler combustion resulting in low NOx emissions.

8 Claims, 3 Drawing Sheets

METHOD TO FACILITATE FLAMELESS COMBUSTION ABSENT CATALYST OR HIGH TEMPERATURE OXIDENT

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

In general, the present invention is directed towards a spontaneous combustion process and apparatus. More particularly, the present invention discloses a process and apparatus whereby flameless combustion may be precipitated and maintained within an essentially oval combustion chamber of an integrated heater/burner apparatus absent catalyst or high temperature oxidant.

BACKGROUND OF THE INVENTION

Conventional furnaces and industrial heaters operate at sufficiently high flame temperatures to form nitrogen oxides, sometimes referred to as oxides of nitrogen or NOx. A thermal combustion system of the contemporary art typically operates by contacting fuel and air in flammable portions with an ignition source and ignites this mixture which then continues to burn. Flammable mixtures of most fuels are normally designed to burn at relatively high temperatures, of approximately 3300° F. and above, which inherently result in the formation of substantial amounts of NOx.

Industrial heaters are well known and represented in the contemporary art. The science and practice of flameless combustion is equally well known and appreciated by those skilled in the art. What is not known is the novel combination of flameless combustion within an essentially oval (as used herein the term "oval" is used synonymously and interchangeably with "round" or "circular" and is intended to encompass any and all combustion chamber configurations allowing for sufficient recirculation of gases to facilitate practice, disclosure and claims of the instant invention) heater to facilitated increased recirculation rates of hot flue gas, fuel gas and air within the heater's radiant section to achieve and maintain flameless combustion and then utilizing increased amounts of flue gas recirculation at increased temperature to allow flue gas to be mixed with fuel gas and combustible air at significantly higher percentages than is possible in the prior art. In the instant invention, ribbons of fuel gas, recirculated flue gas and combustion air are combined within a narrowly defined boundary reach auto ignition temperature and precipitate the combustion process. However, due to the essentially oval character of the internal portion of the instant invention's combustion chamber, the mass flow of recirculated flue gas can be of sufficient quantity to allow gases involved in the combustion process to limitedly experience a temperature variation between approximately 300° to 400° F., versus a temperature differential range of 2800° F., between the hottest flame temperature and the coolest flue gases in the combustion chamber which is common in existing combustion technology. In the instant invention, the maximum temperature anywhere in the invention's combustion chamber never exceeds 2200° F.

Consequently, such reduced temperature virtually eliminates thermal NOx and NOx falls into a selective catalytic reduction range of less than 8 ppmvd. The immediately following table illustrates new window of operation made possible by the apparatus and process of the instant invention.

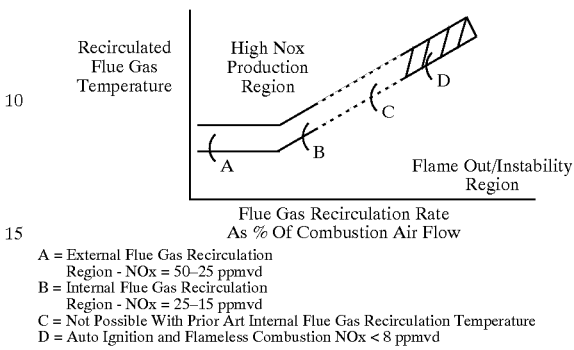

A = External Flue Gas Recirculation Region - NOx = 50–25 ppmvd
B = Internal Flue Gas Recirculation Region - NOx = 25–15 ppmvd
C = Not Possible With Prior Art Internal Flue Gas Recirculation Temperature
D = Auto Ignition and Flameless Combustion NOx < 8 ppmvd Consequently, in view of the deficiencies of the contemporary art, it is an object of the instant invention to disclose and claim a flameless combustion process and apparatus absent involvement of catalyst, high temperature air, or other similarly intended oxidants.

It is a further object of the instant invention to disclose and claim a process and apparatus to achieve flameless combustion with air or other similarly intended oxidant temperatures below 1300° F.

It is yet another object of the instant invention to disclose and claim a process and apparatus to achieve flameless combustion absent necessity for catalyst or flame holder.

Another object of the instant invention is to disclose and claim an integrated heater/burner apparatus. As used herein, the term "heater" is defined, used synonymously and interchangeably as "a refractory lined enclosure containing a heat transfer cooling coil" and the term "burner" is defined, used synonymously and interchangeably as a metering device for fuel, air and recirculated flue gas.

Another object of the instant invention is to disclose and claim an apparatus which embodies an essentially oval combustion chamber that acts as a means for controlling the rate of diffusion of air, fuel and flue gas.

An additional object of the instant invention is to disclose and claim a means by which very uniform flux rates can be achieved via recirculation rates of flue gas beyond that possible initializing heater/burners of the contemporary unit.

A further object of the instant invention is to eliminate cold and hot zones associated combustion chambers with industrial heaters of the prior art.

Yet an additional object of the instant invention is to teach and claim the heater/burner apparatus of reduced size and cooling coil service area while not increasing peak radiant flux rates.

Another object of the instant invention is to introduce a process and apparatus whereby very uniform and cooler combustion may be precipitated, thus creating low NOx emissions measured at less than 8 ppmvd.

Yet another object of the instant invention is to provide for complete combustion at very uniform and controlled temperatures eliminating CO emissions.

Yet another object of the instant invention is to increase radiant efficiency to reduce fuel consumption which will then reduce $CO_2$ and greenhouse gas emissions.

An additional object of the instant invention is to teach an apparatus and process to improve heat transfer thereby reducing a heater cooling coil area required to achieve a specified amount of heat transfer without exceeding prior art peak radiant flux rates.

Other objects and further scope of the applicability of the present invention will become apparent from the detailed description to follow, taken in conjunction with the accompanying drawings wherein like parts are designated by like reference numerals.

BRIEF SUMMARY OF THE INVENTION

A method and apparatus to precipitate and sustain flameless combustion within an essentially oval combustion of an integrated heater/burner apparatus comprising the steps of (a) providing an essentially oval combustion chamber in communication with an air inlet, the air inlet in further communication with an air source external to said essentially oval chamber; (b) providing a fuel source within said combustion chamber, the fuel source introducing a fuel gas, the fuel gas in communication with a fuel supply and said combustion chamber; (c) initializing a heating process within said chamber to preheat the chamber's internal portion to an operational temperature generally ranging between 1400° F. and 2100° F.; (d) introducing air to the oval combustion chamber via said air inlet; (e) precipitating the re-circulation of flue gas within said chamber as a consequence of steps (c) and (d); (f) inerting said fuel gas with said recirculated flue gas; (g) metering and delivering fuel gas to said combustion chamber and fuel gas to be inerted by recirculated flue gas; (h) continuing to meter and heat air, recirculated fuel and flue gas until said air, recirculated fuel and flue gas diffuse into a molecular composite and reach or exceed the auto ignition temperature said composition; and (i) sustaining flameless combustion by maintaining a combustion chamber operational temperature of generally between 1400° F. and 2100° F.

DESCRIPTION OF THE DRAWINGS

Prior art

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
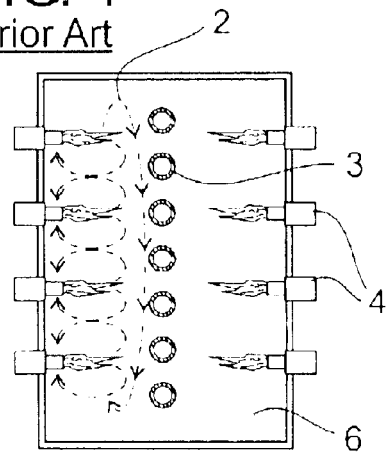
FIGS. 1 through 6 illustrate end wall elevation of contemporary art heaters and further illustrate flue gas recirculation pattern associated with various tube/burner placement configurations.
Figure 2:
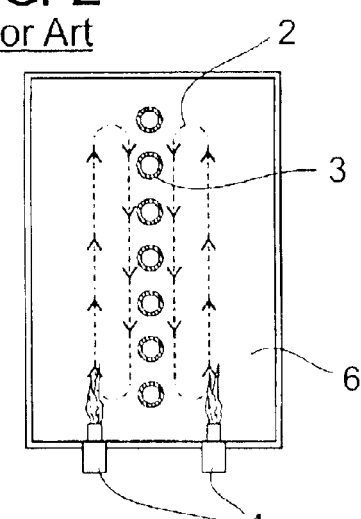
Figure 3:
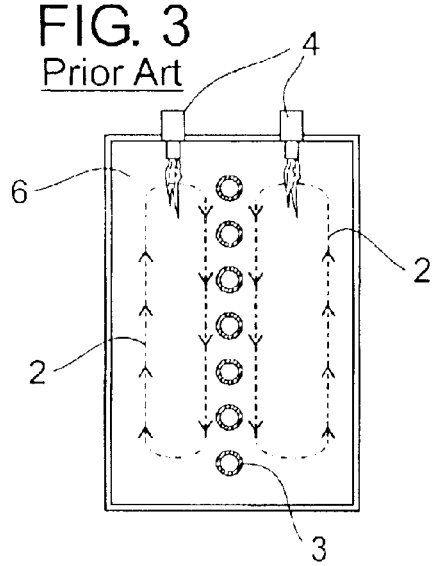
Figure 4:
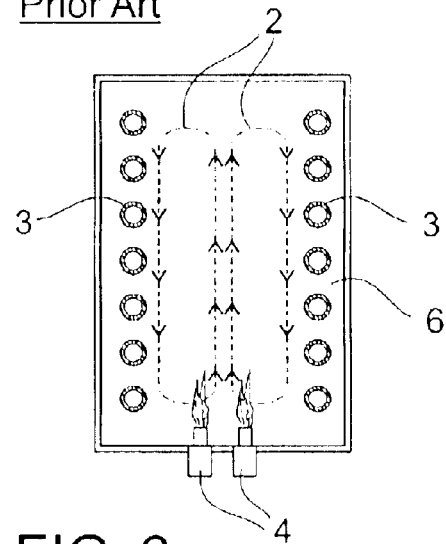
Figure 5:
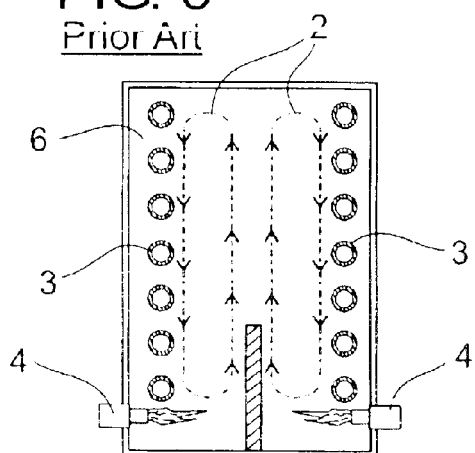
Figure 6:
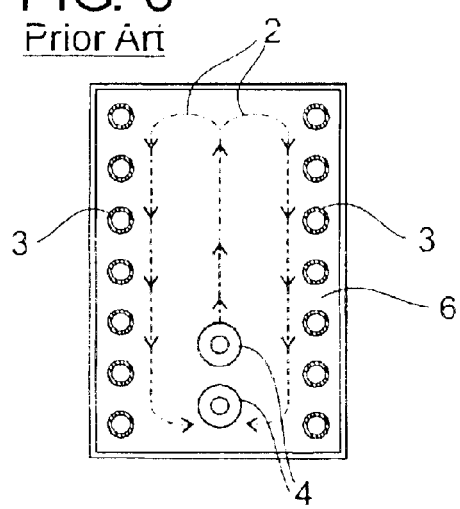

Prior art FIGS. 1 through 6 illustrate the end wall elevations of contemporary art heaters and further illustrate flue gas recirculation patterns associated with various tube/burner configuration used in association with such contemporary art heaters. The flue gas recirculation patterns within configurations of prior art FIGS. 1 through 6 is illustrated by directional arrows 2. In each of the illustrations of the prior art it is readily appreciated that once the internal portion or the temperature of the internal portion of the heater is raised, flue gases rise in an unbounded manner from the lower regions of the furnace to the upper regions whereupon cooling of said gases allows their return in a downward direction to the bottom of the heater. This recirculating pattern as illustrated in prior art FIGS. 1 through 6 clearly unbounded and in general is directed towards and limited to the center most regions of the furnace irrespective of tube placement. For purposes of convenience and ready reference, prior art FIGS. 1 through 3 illustrate double fired tube configuration and prior art FIGS. 4 through 6 illustrate single fired tube placement wherein said tubes serve as the heat transfer mechanism of the furnace. In practice a fluid is introduced to the internal portion of said tubes 3 and the recirculating flue gas 2 provides heat to the external surface of said tubes and facilitates the heating of fluid contained therein. Burner technology 4 well known and practiced by those skilled in the art is used to facilitate the increased temperature of the internal portion 6 of each burner configuration 4 illustrated in prior art FIGS. 1 through 6.

Figure 7:
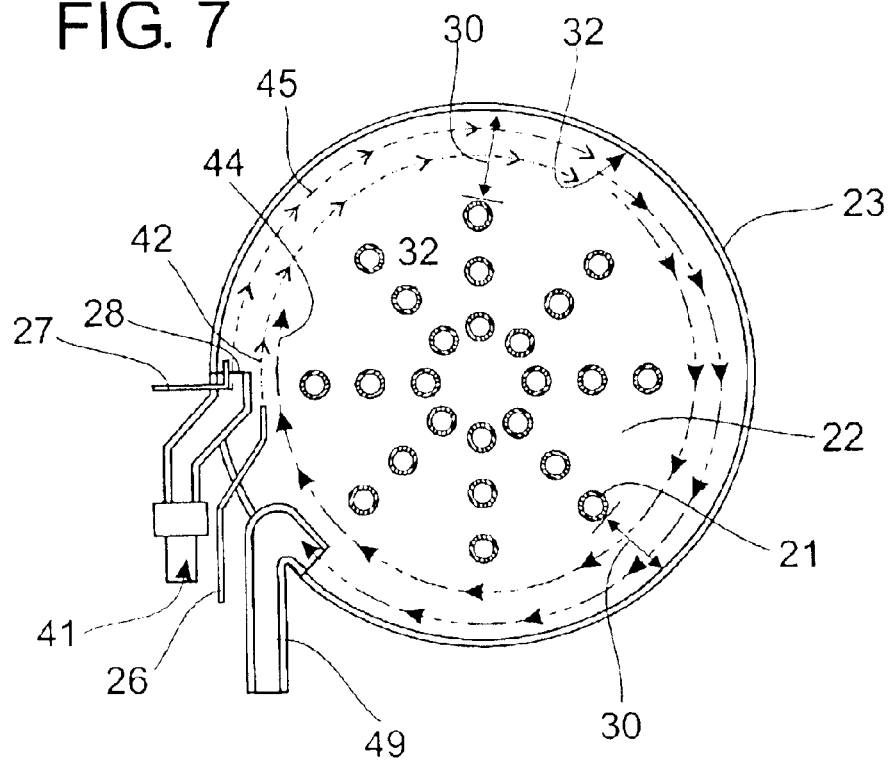
FIG. 7 illustrates one embodiment of the instant invention practiced with a starburst heat transfer tube configuration and singular positioning of a combustion air means, a fuel gas introduction means, and a flue gas exiting means.

FIG. 7 illustrates one embodiment of the instant invention practiced with a starburst heat transfer tube configuration and singular positioning of a combustion air means, a fuel gas introduction means, and a flue gas exiting means. Turning now to FIG. 7.

In FIG. 7 the apparatus of the instant invention is generally indicated as 23. The invention's essentially oval combustion chamber 22 is shown in communication with an air inlet 28 with the inlet 28 in further communication with an air source 41 external to the oval combustion chamber 22. The air source 41 is typically embodied as a blower means or natural draft means well known to those skilled in the art with said blower means or natural draft means introducing heated or unheated air into the combustion chamber 22 at an angle generally ranging between 0° and 40° to the internal sidewall of the heater. Although greater angularity may be afforded via practice of the instant invention, it is noted that introduction of air at an angle between 0° and 40° is found most efficient for introducing volume at sufficient CFM to precipitate centrifugal force to maintain initial and separate ribbons of inerted fuel gas 42, flue gas 44 and air 45 within a narrowly defined boundary indicated as line 30. Said boundary 30 abutting the internal oval surface 32 of the invention 23. A fuel gas source 26 is further provided within the combustion chamber 22 and introduces a fuel gas 42, said fuel gas sources used and introduction of fuel gas is well known and practiced by those skilled in the art when used in association with contemporary art heaters.

As practiced in one embodiment, the internal chamber 22 is first heated by a start up burner 27 located in air inlet 28 to preheat the internal chamber 22 to an operational temperature generally range between 1400° F. and 2100° F. Flue gas 44 within the chamber is recirculated as a consequence of this heating and the introduction of combustible air 45 into the chamber 22 at a angle generally between 0° and 40°. Fuel gas 42 is delivered to the combustion chamber 22 and commingled with the recirculating flue gas 44 in a manner to create two distinct ribbons, combustible air and inerted fuel gas. Air 45 is continuously introduced into the internal portion of the chamber 22 and continues to precipitate the further recirculation and diffusion of air 45, fuel 42 and flue gas 44 molecules until, in combination with the continued monitoring of metered amounts of fuel gas, the molecular composition at the interface of the air and inerted fuel gas reaches or exceeds auto ignition temperature. Once reaching auto ignition temperature, the flameless combustion of the instant invention is maintained by either a manual temperature control means well known to those skilled in the art or software control means, in a manner to sustain said flameless combustion in an operational temperature in the chamber generally between 1400° F. and 2100° F. Recirculating flue gas exiting means 49 is also illustrated in FIG. 7 provides an exiting means by which internal pressure of the oval combustion chamber may be equalized in consideration of purposely introduced fuel gas 42 and combustible air 45.

Figure 8:
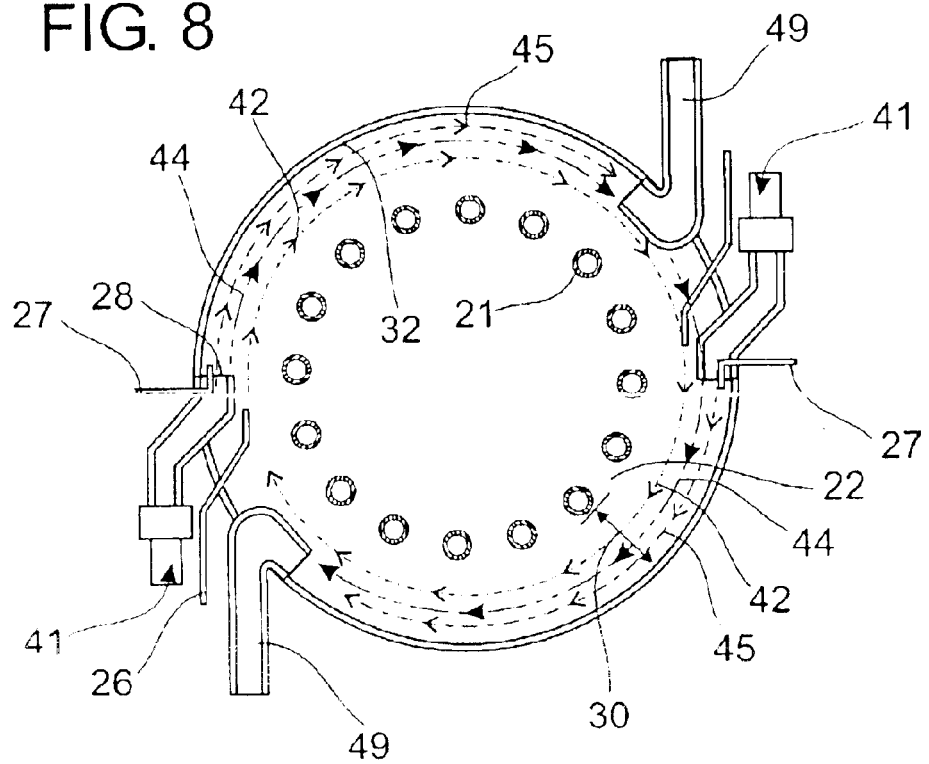
FIG. 8 illustrates the single position combustible air means, an fuel gas introduction means and flue gas exiting means of FIG. 7 when used in association with a circular pattern positioning of heater transfer tubes.

FIG. 8 illustrates a dual position combustible air means, fuel gas introduction means and flue gas exiting means when used in association with a circular pattern positioning of heater transfer tubes.

In FIG. 8 it is again observed where the recirculating pattern of combined combustible air, flue gas and fuel gas allows for the maintaining of a boundaried parameter wherein flameless combustion occurs within the boundary 30. Though fully efficient as illustrated in FIG. 7, the dual position combustible air fuel gas introduction means and flue gas exiting means of FIG. 8 may be practiced in an attempt to increase or balance fuel gas 42, flue gas 44 and combustible air 45 flow/velocity.

Figure 9:
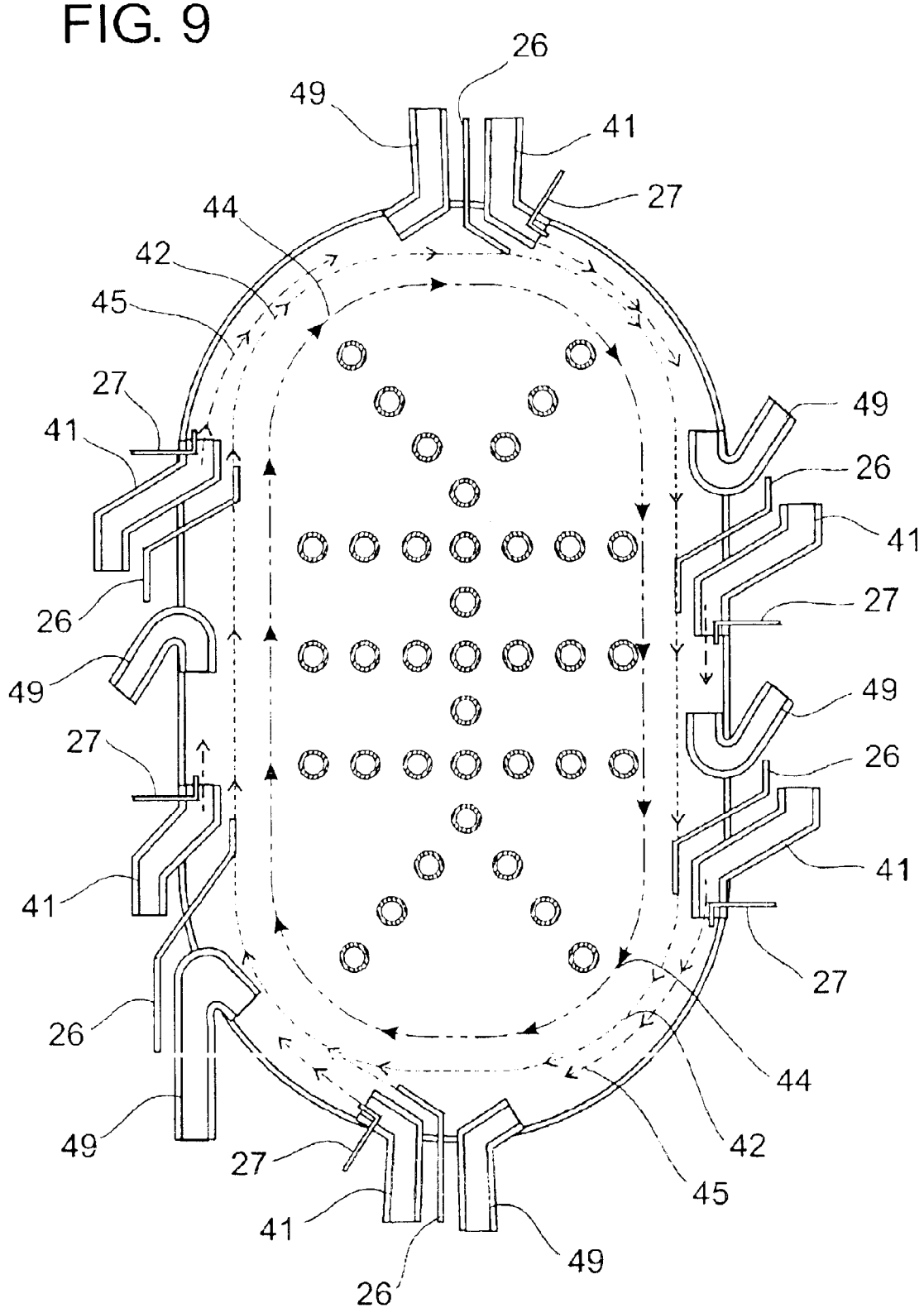
FIG. 9 illustrates an alternative embodiment of the instant invention wherein multiple starburst configured tubes are illustrated and positioned within the internal portion of the invention combustion chamber and multiple positioned combustible air means, fuel gas introduction means and flue gas exiting means are positioned around the boundary of the invention's combustion chamber.

FIG. 9 illustrates an alternative embodiment of the instant invention wherein multiple starburst configured tubes are illustrated and positioned within the internal portion of the invention combustion chamber and multiple positioned combustible air means, fuel gas introduction means and flue gas exiting means are positioned around the boundary of the invention's combustion chamber. FIG. 9 also illustrates an embodiment wherein additional fuel gas and combustible air inlets may be provided to facilitate equalized velocity within the non-circular but essential oval internal combustion chamber. In FIG. 9 it is also noted the versatility of the instant invention in accommodating multiple groupings of heat transfer tubes in varied configurations. As is apparent to those skilled in the art, the configuration of FIG. 9 or other similarly intended configurations may be replicated at several elevations or locations so that the basic process is maintained while increasing the size and capacity of the apparatus.

It will of course be understood that various changes may be made in form, details, arrangement and proportions of the apparatus without departing from the scope of the invention, which generally stated consists of an apparatus capable of carrying out the objects above set forth, in the parts as disclosed and defined in the appended claims.

What is claimed is:

1. A method to precipitate and sustain flameless combustion within an essentially oval combustion chamber of an integrated heater/burner apparatus comprising the steps of:
    (a) providing an essentially oval combustion chamber in communication with an air inlet, the air inlet in further communication with an air source external to said essentially oval chamber;
    (b) providing a fuel source within said combustion chamber, the fuel source introducing a fuel gas, the fuel gas in communication with a fuel supply and said combustion chamber;
    (c) introducing air to the oval combustion chamber via said air inlet;
    (d) initializing a heating process within said chamber to preheat the chamber's internal portion to an operational temperature generally ranging between 1400° F. and 2100° F.;
    (e) precipitating the re-circulation of flue gas within said chamber as a consequence of two steps (c) and (d);
    (f) metering and delivering fuel gas to said combustion chamber;
    (g) inerting fuel gas with said recirculating flue gas;
    (h) continuing to meter and heat air, inerted fuel gas and recirculated flue gas until said air, recirculated fuel and flue gas diffuse into a molecular composite and reach or exceed the auto ignition temperature said composition; and
    (i) sustaining flameless combustion by maintaining a combustion chamber operational temperature of generally between 1400° F. and 2100° F. while simultaneously providing an exiting means by which internal pressure of the combustion chamber may be equalized in consideration of purposely introduced fuel gas and combustible air.

2. The method of claim 1 further comprising the preheating of air prior to its introduction to the oval combustion chamber to an operational temperature generally ranging between 450° F. and 1400° F.

3. The method of claim 1 wherein said fuel gas is selected from the group of formulas consisting of at least one of the following typical fuel gases $H_2$, $CO$, $CH_4$, $C_2H_6$, $C_2H_4$, $C_3H_8$, $C_3H_6$, $C_4H_{10}$, $C_4H_8$, $C_5H_{12}$ and $C_6H_{14}$.

4. The method of claim 1 wherein said sustaining of flameless combustion by maintaining a combustion chamber operational temperature of generally between 1400° F. and 2100° F. further comprises the immediate introduction of fuel gas according to software controlled temperature sensing means.

5. A method to precipitate and sustain flameless combustion within an essentially round combustion chamber of an integrated heater/burner apparatus comprising the steps of:
    (a) providing an essentially round combustion chamber in communication with an air inlet, the air inlet in further communication with an air source external to said essentially round chamber;
    (b) providing a fuel source within said combustion chamber, the fuel source introducing a fuel gas, the fuel gas in communication with a fuel supply and said combustion chamber;

(c) introducing air to the round combustion chamber via said air inlet;

(d) initializing a heating process within said chamber to preheat the chamber's internal portion to an operational temperature generally ranging between 1400° F. and 2100° F.;

(e) precipitating the re-circulation of flue gas within said chamber as a consequence of two steps (c) and (d);

(f) metering and delivering fuel gas to said combustion chamber;

(g) inerting fuel gas with said recirculating flue gas;

(h) continuing to meter and heat air, inerted fuel gas and recirculated flue gas until said air, recirculated fuel and flue gas diffuse into a molecular composite and reach or exceed the auto ignition temperature said composition; and (i) sustaining flameless combustion by maintaining a combustion chamber operational temperature of generally between 1400° F. and 2100° F. while simultaneously providing an exiting means by which internal pressure of the combustion chamber may be equalized in consideration of purposely introduced fuel gas and combustible air.

6. The method of claim 5 further comprising the preheating of air prior to its introduction to the round combustion chamber to an operational temperature generally ranging between 450° F. and 1400° F.

7. The method of claim 5 wherein said fuel gas is selected from the group of formulas consisting of at least one of the following typical fuel gases $H_2$, CO, $CH_4$, $C_2H_6$, $C_2H_4$, $C_3H_8$, $C_3H_6$, $C_4H_{10}$, $C_4H_8$, $C_5H_{12}$ and $C_6H_{14}$.

8. The method of claim 5 wherein said sustaining of flameless combustion by maintaining a combustion chamber operational temperature of generally between 1400° F. and 2100° F. further comprises the immediate introduction of fuel gas according to software controlled temperature sensing means.

\* \* \* \* \*

UNITED STATES PATENT AND TRADEMARK OFFICE
CERTIFICATE OF CORRECTION

PATENT NO. : 6,796,789 B1
DATED : September 28, 2004
INVENTOR(S) : William C. Gibson, Robert L. Gibson and James T. Eischen It is certified that error appears in the above-identified patent and that said Letters Patent is hereby corrected as shown below:

<u>Title page, Item [54] and Column 1, line,</u>
Title, please change to read -- METHOD TO FACILITATE FLAMELESS COMBUSTION ABSENT CATALYST OR HIGH TEMPERATURE OXIDANT --;

Signed and Sealed this

Fifth Day of April, 2005

JON W. DUDAS
*Director of the United States Patent and Trademark Office*